United States Patent [19]

Roberts

[11] 4,347,819
[45] Sep. 7, 1982

[54] IGNITION SPARK ADVANCE USING A CONSTANT PEAK TO PEAK AMPLITUDE TIMING SIGNAL WITH A FREQUENCY TIED TO ENGINE SPEED

[75] Inventor: William J. Roberts, Toledo, Ohio

[73] Assignee: Eltra Corporation, Toledo, Ohio

[21] Appl. No.: 99,802

[22] Filed: Dec. 3, 1979

[51] Int. Cl.³ .............................................. F02P 5/08
[52] U.S. Cl. ................................... 123/415; 123/418; 123/427; 307/269
[58] Field of Search ............... 123/415, 418, 427, 485, 123/414; 307/269; 328/63

[56] References Cited

U.S. PATENT DOCUMENTS

| | | | |
|---|---|---|---|
| 3,314,407 | 4/1967 | Schneider | 123/148 |
| 3,356,896 | 12/1967 | Shano | 315/209 |
| 3,660,689 | 5/1972 | Oishi et al. | 123/415 |
| 3,885,534 | 5/1975 | Webster | 123/415 |
| 3,885,720 | 5/1975 | Brennan | 123/415 |
| 3,996,911 | 12/1976 | Canup | 123/148 E |
| 4,035,619 | 7/1977 | Cholet | 123/415 |
| 4,063,538 | 12/1977 | Powell et al. | 123/117 R |
| 4,066,968 | 1/1978 | Guipaud | 328/1 |
| 4,102,311 | 7/1978 | Crall et al. | 123/415 |
| 4,114,574 | 9/1978 | Platzer, Jr. | 123/415 |
| 4,164,926 | 8/1979 | Kindlmann | 123/415 |
| 4,201,926 | 5/1980 | Caron | 123/415 |

Primary Examiner—Charles J. Myhre
Assistant Examiner—Andrew M. Dolinar
Attorney, Agent, or Firm—Joel I. Rosenblatt; James P. DeClercq

[57] ABSTRACT

A phase-lock loop ties a reference input frequency such as for the rotational speed of an engine with an engine timing signal. The engine timing signal is a sawtooth with a peak to peak amplitude and with the phase of the timing signal corresponding to the instantaneous amplitude of the timing signal between its peak to peak extremes.

The phase-lock loop comparison, produces a drive or speed signal which is also indicative of the reference signal frequency. The level of the drive or speed signal, is that necessary to maintain the period of the timing signal in correspondence with the reference input signal.

A third signal may be generated, proportional to the engine rotational speed signal, or to any other engine parameter which is compared to the timing signal to produce a trigger signal at the appropriate phase angle of the engine rotational cycle.

27 Claims, 9 Drawing Figures

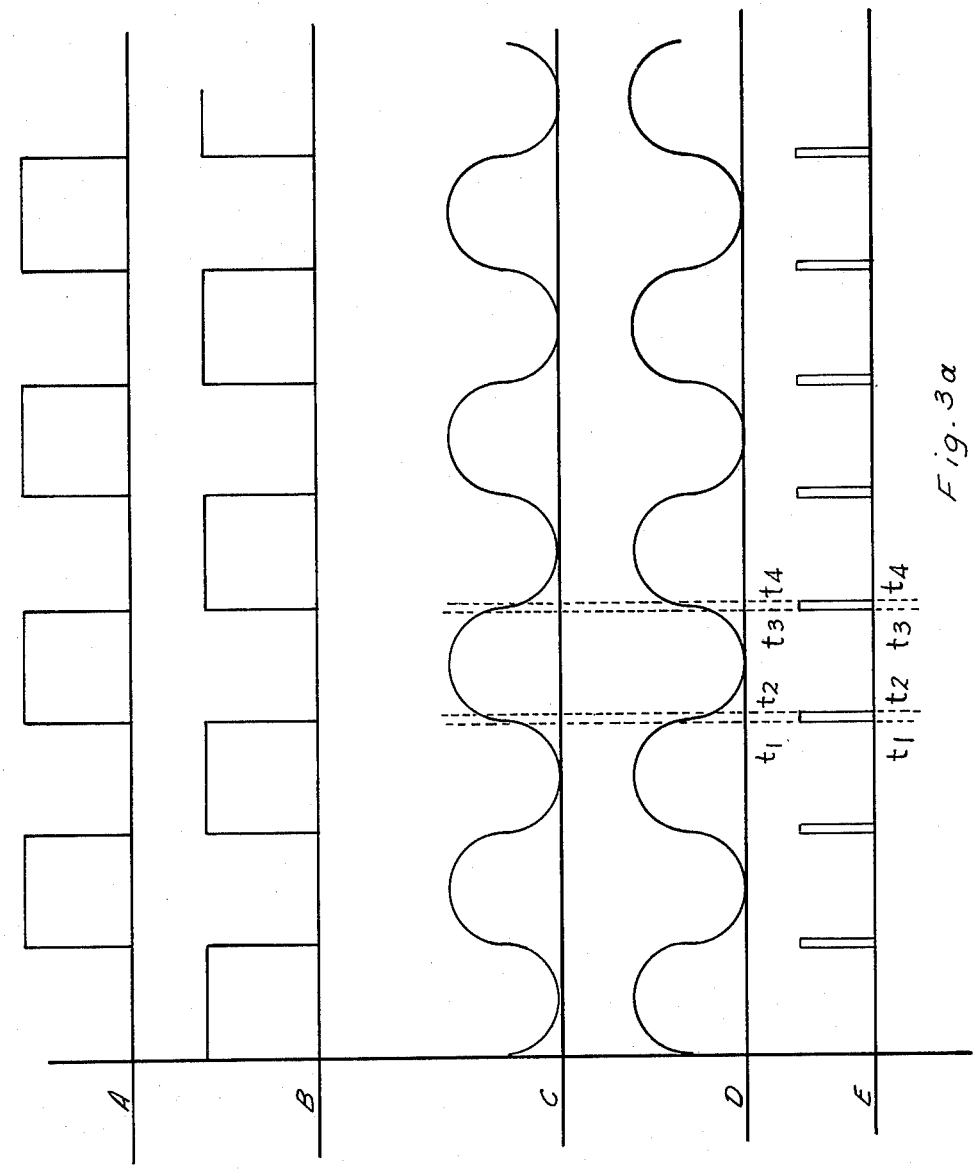

Top View

4,347,819

IGNITION SPARK ADVANCE USING A CONSTANT PEAK TO PEAK AMPLITUDE TIMING SIGNAL WITH A FREQUENCY TIED TO ENGINE SPEED

FIELD OF THE INVENTION

This invention is in the field of variable frequency timing signal generators, producing a constant peak to peak amplitude signal, having a frequency tied to an input reference frequency and which is used to control cyclical timing such as ignition timing in an internal combustion engine. In this application, the input reference signal is the rotational engine speed.

BACKGROUND OF THE INVENTION

There exist examples of electronic timing circuits producing a spark signal at a desired rotational angle of an internal combustion engine. For example, U.S. Pat. No. 4,066,968, Guipaud generates ramps and D.C. levels to produce time delays.

U.S. Pat. No. 4,035,619, Cholet shows a signal synthesizer which combines a rotational speed signal and an intake manifold pressure signal. An advance signal is generated responsive to these two input signals for a particular engine characteristic.

U.S. Pat. No. 4,063,538, Powell requires peak combustion chamber pressure be kept at a fixed angular position. Pressure is sensed in the combustion chamber and spark timing is varied to phase lock the position of the pressure peak to a fixed reference position.

U.S. Pat. No. 3,966,911, Canup uses a digital process to control the spark advance with an internal combustion engine.

While these patents contain examples of controlling the instant when a spark ignition signal is provided with reference to engine rotation angle and engine speed, they do not provide a system having a feedback arrangement to precisely control the period of a constant peak to peak amplitude timing signal corresponding to the engine speed.

These examples do not show, as a basic unit within the system, a cyclical signal generator producing a varying amplitude timing wave having a constant peak to peak amplitude and with its frequency and phase tied to a reference input signal through a phase-locked loop.

These examples also do not show the use of a sawtooth constant peak to peak amplitude phase-locked loop generated signal, used to time an ignition system, where the saw-toothed timing signal period is tied to a reference signal corresponding to engine speed, and where the saw-tooth is used together with an engine spark advance curve signal, and wherein the ignition signal is triggered at a particular amplitude of the timing signal, corresponding to a particular amplitude of the engine spark advance curve signal, and corresponding to a predetermined angle of advance.

Additionally not shown is a means for changing the engine spark advance curve signal with regard to other engine conditions, such as engine vacuum, and for varying the level of the advance curve signal with respect to engine vacuum to change the engine rotational angle at which the spark signal is generated.

DESCRIPTION OF THE INVENTION

A signal generator is provided with an input reference frequency for producing a cyclical signal having a varying amplitude level and which may be a saw-tooth.

A means is connected to the output of the cyclical signal generator and to the input reference frequency, for comparing the two signals and producing a drive signal. This force signal has an amplitude appropriate to drive the phase and frequency of the cyclical signal into coincidence with the reference input signal.

The cyclical signal generator produces a timing signal having a constant peak to peak amplitude so its level at any instant of time during a period of oscillation is indicative of its phase angle.

The generator described above may be incorporated into a larger system such as a spark advance control system for an internal combustion engine. In such an application, the reference input signal would be indicative of engine speed, and a further means is provided to produce a varying signal having an amplitude responsive to engine speed and corresponding to a predetermined engine spark advance curve.

In order to control the firing time of an ignition coil with respect to engine rotation, the system has a comparator which compares the amplitude of the spark advance curve signal with the timing signal.

As the timing signal has an amplitude varying over its period of oscillation and between a constant peak to peak amplitude, its amplitude at any instant of time is indicative of engine rotational angle. A correspondence then for example, between the engine spark advance curve signal and the timing signal, could then be used to trigger the spark coil, so that an appropriate spark signal is generated at the correct engine angle.

In the fixed amplitude timing signal a fixed increment of voltage represents the same increment of angular position, without reference to engine speed. This simplifies the advance curve generator, which can be designed with linear circuits with low temperature sensitivity and also allows simplest processing of additional signals such as a vacuum responsive signal. A vacuum sensor or any other means responsive to a desired engine parameter then could be provided to vary the amplitude of the advance signal, with respect to that parameter.

In the desired feedback arrangement, the cyclical output signal, which may be a saw-tooth or any other waveform varying within a substantially constant peak to peak amplitude is compared to an input reference frequency to lock both signals in phase and frequency.

Accordingly, this system utilizes a sensor generating a signal having a frequency indicative of engine speed. A frequency multiplier, connected to the sensor generates a pulse output at a frequency double that of the input speed. The output of the frequency doubler is connected to a phase-locked loop. The phase-locked loop is additionally connected to the output of a timing oscillator which may be a saw-tooth generator. The phase comparator provides a drive signal or speed signal with an amplitude level responsive to the comparison between the saw-tooth timing signal and the engine speed signal which is then used as a driving signal to the input of the cyclical saw-tooth generator. The output of the saw-tooth generator is of substantially constant peak to peak amplitude and with a period responsive to the amplitude of the drive signal and corresponding to the period of the engine speed signal.

A comparator is connected to the saw-tooth signal and to the spark advance signal. The saw-tooth waveform, having a frequency tied to the engine input frequency through the phase-locked loop, provides a timing reference signal. The other input to the comparator is the spark advance curve signal, whose amplitude is proportional to engine speed.

A matching of spark advance curve signal level with the level of the saw-tooth signal then provides a trigger signal, at the appropriate engine angle, for a particular engine speed as indicated by the spark advance curve signal amplitude.

The trigger signal may be used as an input to a spark ignition system to produce a high energy discharge at an appropriate engine rotational angle or may be used to trigger any other mechanism which must be activated at a predetermined angle or at a predetermined time within a period of any cyclical operating device. The use of such a timing system in an internal combustion engine is shown as one example of the use of such a timing device.

BRIEF DESCRIPTION OF THE DRAWINGS

FIG. 3a shows the waveforms at selected points in the circuit of FIG. 3.

BEST MODE FOR CARRYING OUT THE INVENTION

Figure 1:
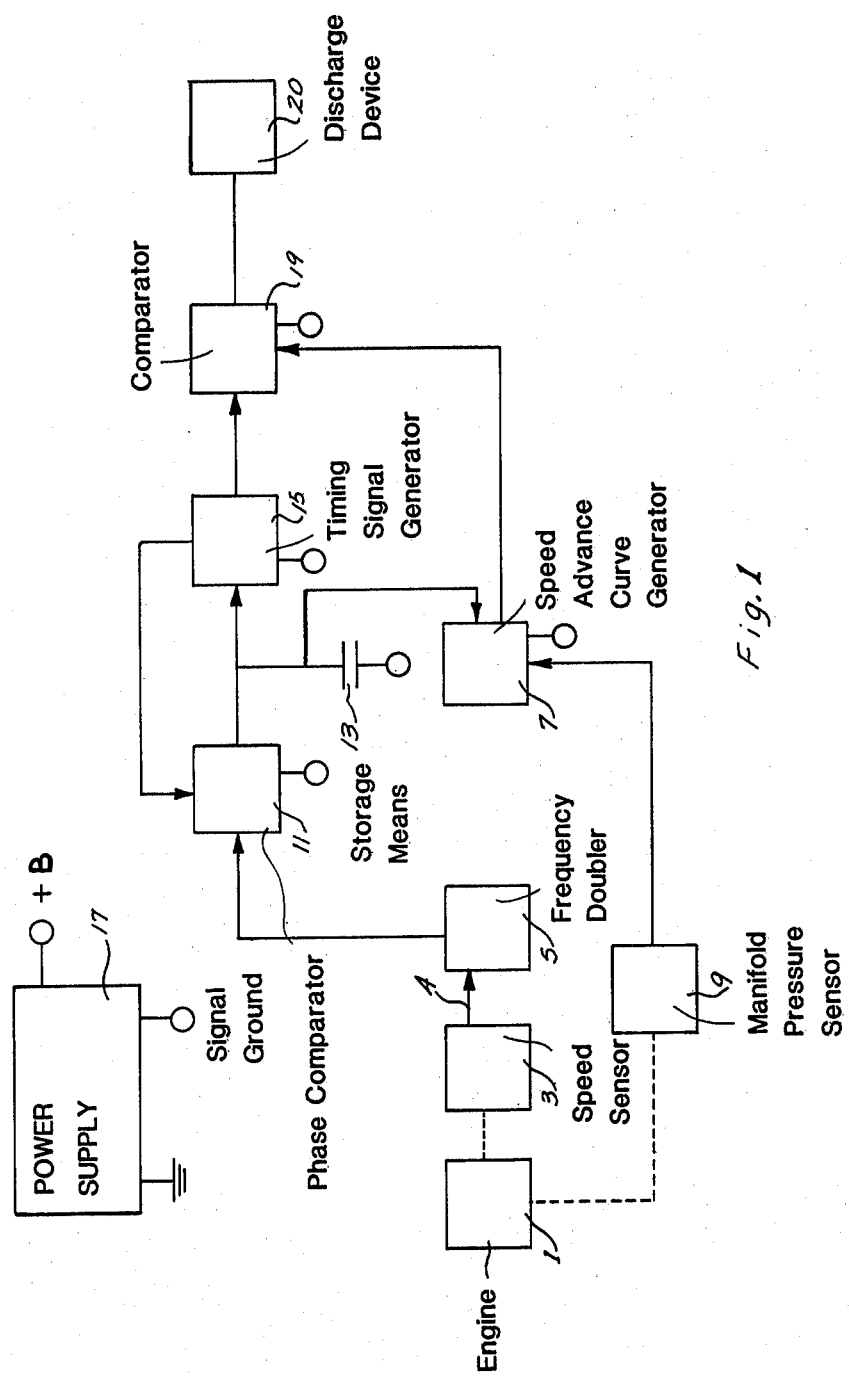
FIG. 1 is the system in a block diagram.

The invention is shown in a functional block diagram in FIG. 1.

An engine 1 has associated with it a speed sensor 3 as shown by the dash line interconnecting it with the engine 1. In addition, the engine 1 may be interconnected with other sensing devices such as means 9 for sensing intake manifold pressure which in turn may be connected to the speed advance curve generator 7 as shown.

An engine speed sensor which may be used with this invention is as shown and described in U.S. Pat. No. 3,316,448.

The outputs of the speed sensor may be two signals, being the complement of each other and having a frequency substantially that of the engine rotational speed. The speed signals or output of the sensing circuit 3 then may be provided to a frequency doubler 5 which then produces a series of pulses having a frequency twice that of the engine speed.

The output of frequency doubler 5 indicative of engine speed is then provided to a means 15 for generating a cyclical timing signal.

A storage means 13 is shown for continuously providing a drive or speed signal level. As will be recognized by one skilled in the art, the storage means affects both the frequency range and the response of the system to rapid changes in engine speed.

A power supply shown as 17 is provided having a B+ for connection to the various elements of the system requiring power. It has an earth ground and a signal ground which may be equal to or separated from the earth ground by a potential difference. In disclosing the preferred embodiment of this invention, the connection to the signal ground will be shown by termination of the signal path by an "O" as shown with regard to functional block 17 while termination of the signal path in earth ground will be shown by the commonly accepted earth ground connection.

While a frequency doubler is shown, it should be understood that such a doubler is not necessary to the practice of the invention as any suitable means to provide a reference signal, having a frequency indicative of engine speed or any other reference could be used.

The function of the spark advance curve generator 7 as will be explained, is to produce the signal having an amplitude responsive to engine speed. The spark advance curve characteristic varies proportionally to the engine speed and may be linear or nonlinear as desired for a particular engine.

A part of the means for generating a cyclical signal, which is used as the system timing signal is timing signal generator 15, which produces a saw-tooth waveform having a constant peak to peak amplitude. However, it should be understood that any suitable timing signal waveform of the kind described can be generated and this invention is not limited to the generation of a saw-tooth.

The output of the timing signal generator 15 is fed back to the phase comparator 11 and to the comparator 19. The output of the phase comparator 11 is provided to a storage device 13 and to the input of the timing signal generator 15.

The signal level at the storage device 13 provides a driving or speed signal to the generator 15, with the frequency of the generator 15 being responsive to the level of the driving or speed signal.

The driving or speed signal level, in turn, is responsive to the comparison between the timing signal waveform at the output of generator 15 and to the input engine speed signal from voltage doubler 5.

It should be understood that any suitable comparator for measuring phase difference could be used to provide a signal at an appropriate level to drive the generator 15 at the appropriate frequency and phase.

The signal generator 15 may be a voltage controlled oscillator whose frequency varies with respect to the signal level on storage device 13, so that any difference between the frequency of the timing signal and the engine speed signal would produce a corresponding change in amplitude level on storage device 13 which would drive the frequency of the timing signal generator in the appropriate direction and toward a frequency and phase substantially that of the engine speed signal.

In this regard, the level of the signal on storage device 13 then is indicative of the engine rotational speed as it is responsive to the signal at the output of frequency doubler 5. For the purpose of this disclosure, the signal on storage device may be called the drive or speed signal.

As explained above, the output of the spark advance curve generator 7 is a level commensurate with the engine speed. This signal is provided to a comparator 9, which also has as its input the saw-tooth timing signal from timing signal generator 15. The comparator then compares the timing signal level and produces a trigger signal at coincidence of the timing signal amplitude and the spark advance curve amplitude.

Figure 2:
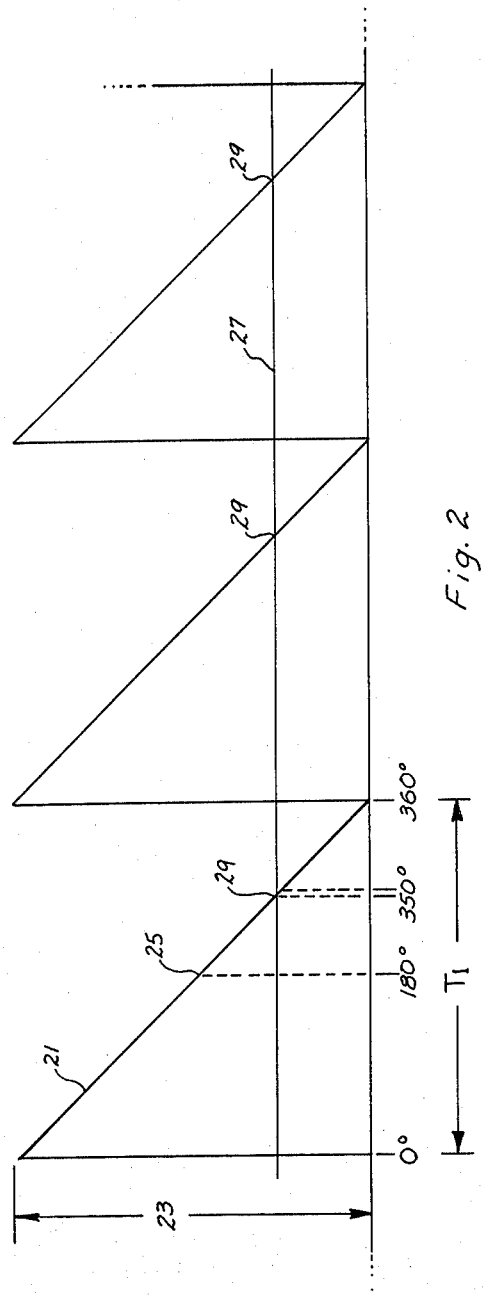
FIGS. 2 and 2a are the timing signal output waveforms showing the trigger signal generated at a predetermined angle.

As shown in FIG. 2, the timing signal may be a saw-tooth 21 and have a constant peak to peak amplitude 23 with a period T1 commencing at reference engine rotational angle zero and terminating at engine rotational angle 360°.

The period of the timing signal coinciding with the period of the engine is shown by way of example only. The period of the timing signal may be 180° of engine rotational angle, with a spark advance of 5° provided at 175°, for example, where two spark trigger signals are provided for each full engine revolution. Alternatively, four trigger signals in an engine cycle could be provided by limiting the period of the timing signal to one quarter, or 90°, of engine rotation. Also, the timing signal period can be larger than the engine period, and multiple trigger signals can be generated within an engine period, or over a plurality of engine periods.

As can be seen in FIG. 2 for the case of the saw-tooth timing signal 21, the amplitude varies over the period, indicative of engine rotational angle. For example, at 180°, the amplitude level would be as indicated by 25.

A spark advance signal level 27 is shown superimposed on the timing signal 21. The coincidence of the speed advance signal level and the timing signal is shown at points 29, it being understood that where the engine frequency remains constant, the coincidence of the spark advance signal amplitude and timing signal amplitude will always be at the same engine rotational angle. As shown in the example in FIG. 2, the engine rotational angle shown is 350°, providing a spark advance of 10° before a reference position.

The comparator 19 provides a trigger signal to an appropriate high energy discharge device 20 or to any other suitable device which is to be active at a particular angle in a cycle. In the case of a high energy discharge device, a coil is energized and deenergized to generate a high energy spark.

The spark advance signal level 27 shown in FIG. 2 is for a predetermined engine speed. It should be understood that the level 27 varies in amplitude and would intersect with the timing signal at different amplitudes for different engine rotational angles to provide a trigger signal at different spark advance angles commensurate with engine speed.

As can be seen then, a spark advance curve signal provides an amplitude indicative of engine speed. That signal is compared with the timing signal, which has a constant peak to peak amplitude, whose instantaneous value is indicative of engine rotational angle. Comparison of these two signals then can provide the proper trigger signal at the appropriate engine rotational angle for a given engine speed.

As can be seen, as the engine speed increases, the engine advance curve signal level 27 will increase, intersecting with the timing signal amplitude earlier in the cycle to provide the trigger signal output at an earlier moment in the period of the timing signal and at an increasing angle of advance.

Figure 3:
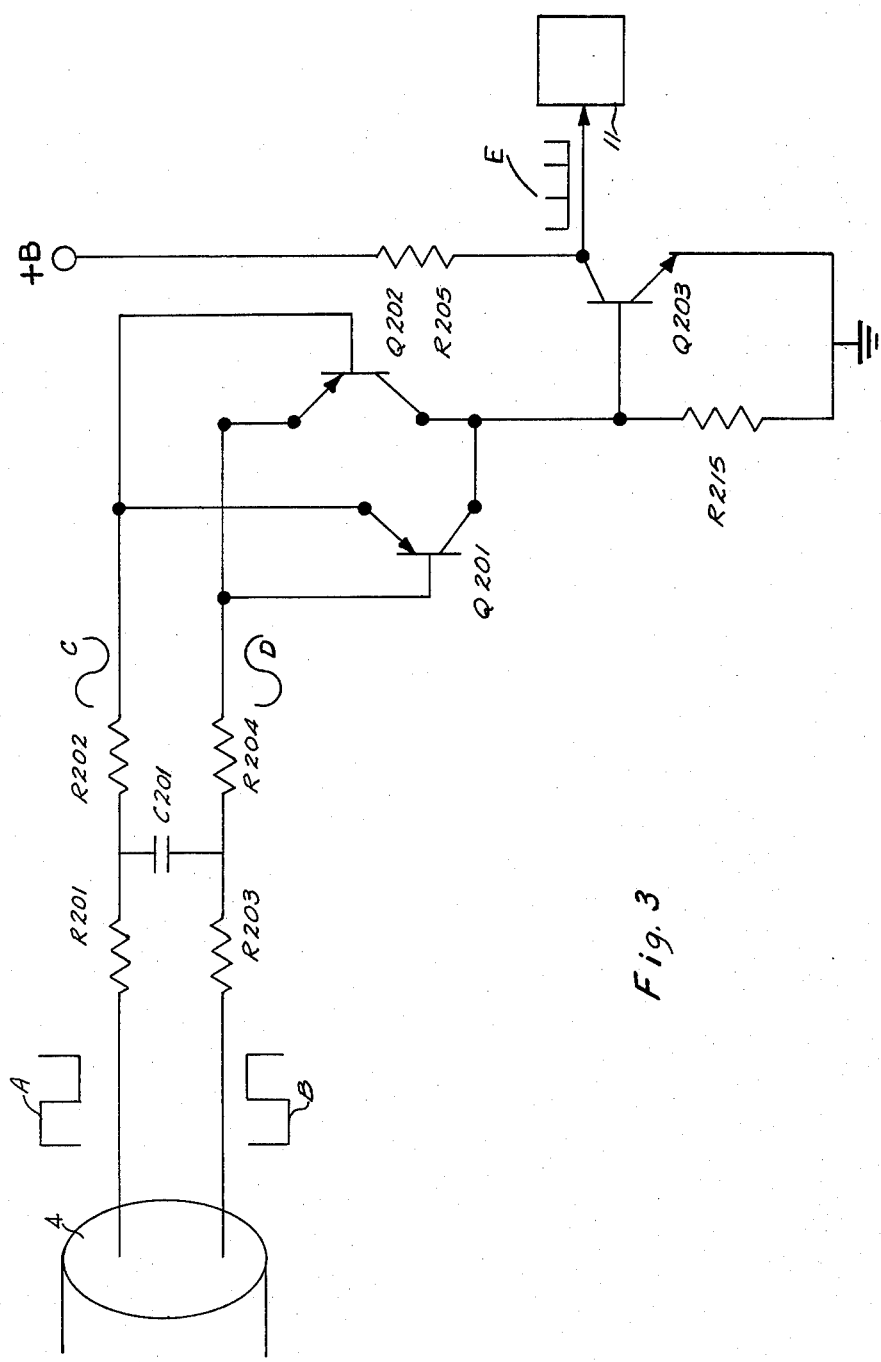
FIG. 3 shows in detail the frequency doubler of block 5 of FIG. 1.

Now referring to FIGS. 3 and 3a, the apparatus shown in block 5 of FIG. 1 and providing a frequency doubled output is described.

As shown in FIGS. 3 and 3a, the outputs A and B of the sensor 3 are substantially complementary square waves provided to doubler 5 on bus 4.

The signals A and B on bus 4 pass through the filter network comprising resistances R201, R202, R203, R204 and C201. As can be seen from FIG. 3, the filter forces the square waveform into a sloped waveform so the slope of wave B is rising as the slope of wave C is falling and vice-versa.

At the output of the filter, transistor Q202 is driven into cutoff by the waveform C. As can be seen, when the polarity of signal C is reversed driving transistor Q202 into conduction, Q201 is driven into cutoff by signal C.

By properly structuring the values of the filter network, the amplitudes of signal C and signal D at the output of the filter network, each will be within a coincident range, every half cycle, where transistor Q201 and Q202 will be cut off. This range is shown as between times t1-t2 and t3-t4 in FIG. 3a. At this moment, the base drive provided to transistor Q203 through resistance R215 will be removed, driving transistor Q203 into cutoff and raising the voltage at the collector of transistor Q203 and providing a voltage pulse E every half cycle of the signals A, B, C, and D and thereby providing a frequency doubled signal to the cyclical timing signal generator.

Figure 7:
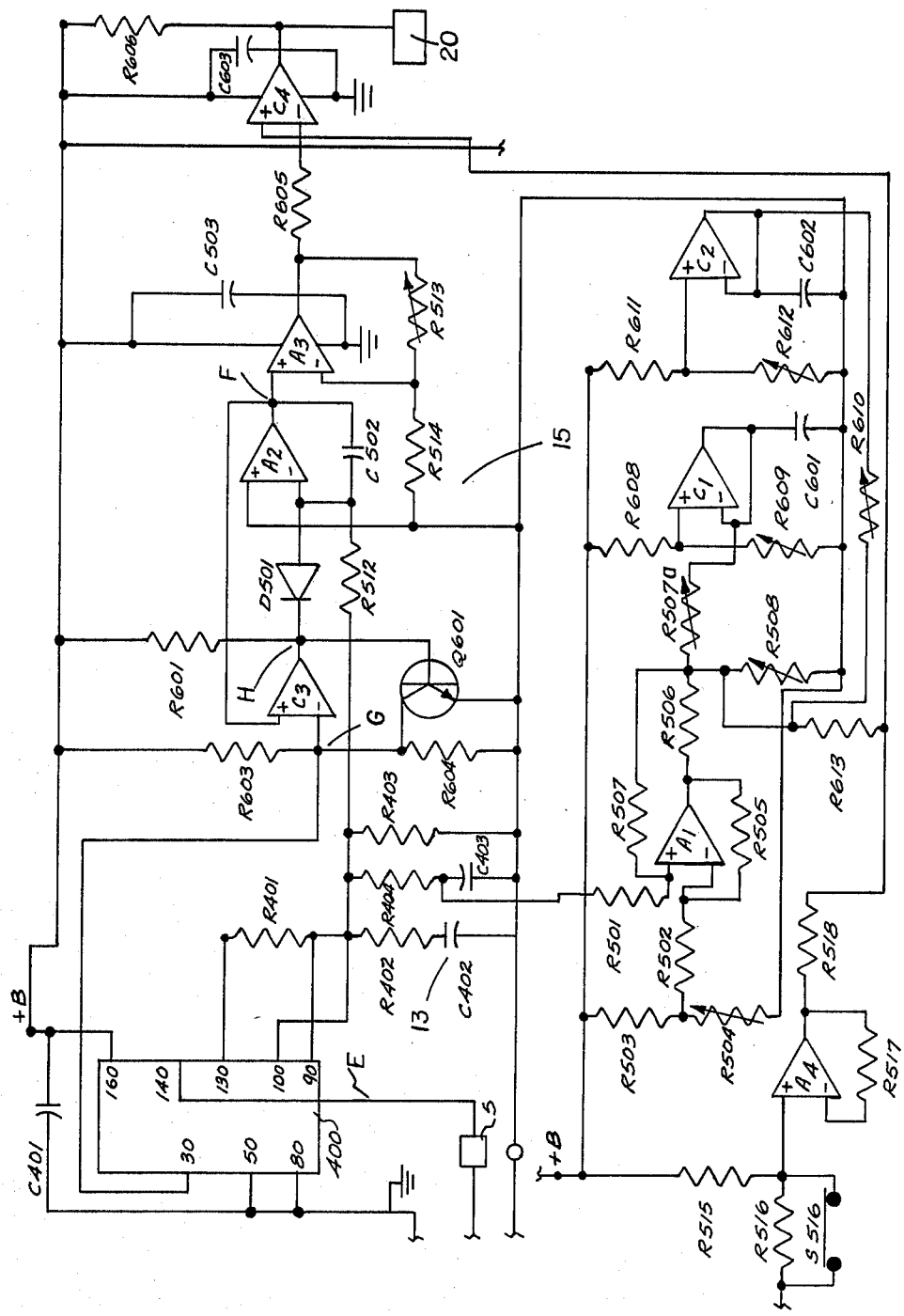
FIG. 7 is the detailed circuit arrangement for the timing signal and spark advance curve generators.

A novel arrangement of this invention, comprising the timing signal generator is now shown with reference to FIG. 7 describing in greater detail the functional block diagrams 11, 13, 15 and 19.

Now, referring to FIG. 7, the portion of the timing system comprising the signal generator 15, the phase comparator 11, the spark advance curve generator 7 and comparator 19 is described.

In the case of an ignition timing circuit, the cyclical frequency output may be a saw-tooth as shown and the reference input frequency would be indicative of engine speed.

In this application the driving signal, also referred to as a speed signal, has a level indicative of the engine speed. That signal appears on storage device 13 in FIG. 1, being the same as capacitor C402 shown in FIG. 7.

Additionally shown within FIG. 7 the spark advance curve signal generator shown as functional block diagram 5 derives its input signal from the speed signal on capacitor C402.

Figure 5:
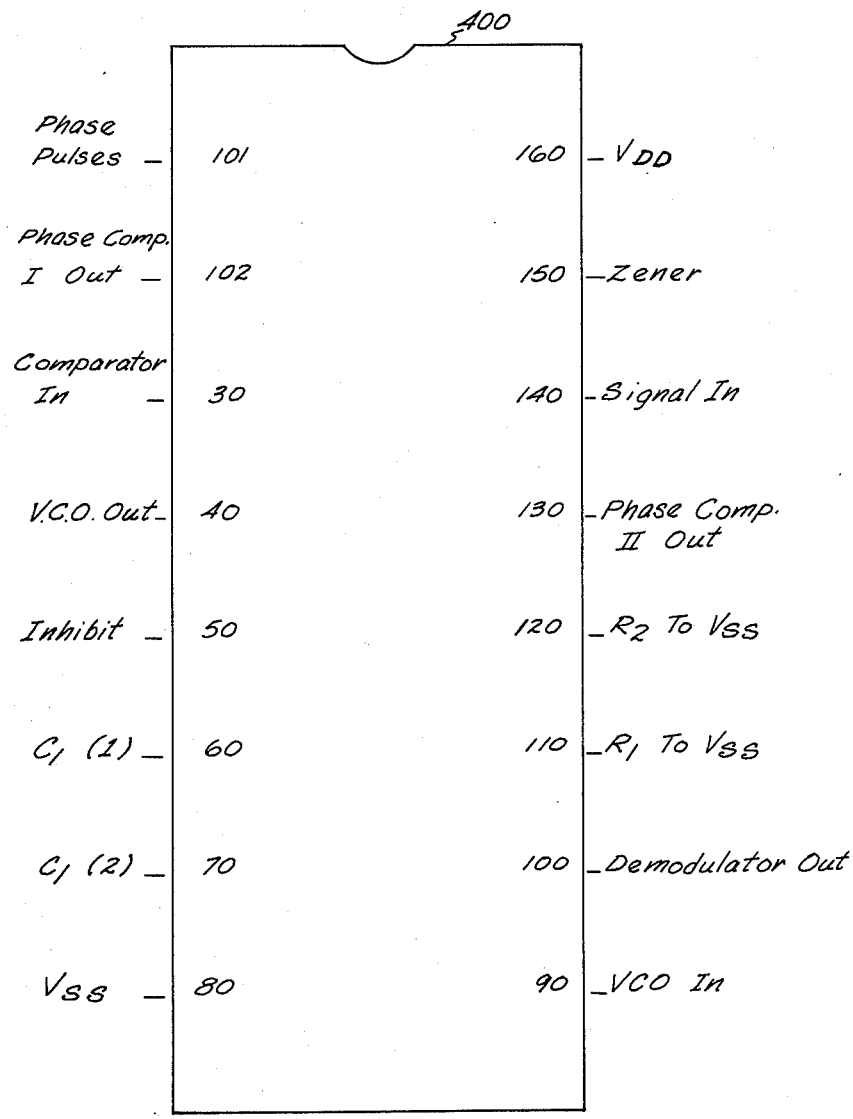
FIG. 5 is the terminal arrangement of the phase comparator shown in block 11.

The portion of the cyclical signal generator referred to in functional block diagram 11 of FIG. 1, is a phase comparator for comparing the reference input signal with the output of the cyclical signal generator or timing signal generator 15, and is shown as numeral 400 in FIG. 7. As used in the preferred embodiment, this device may be CD 4046B COS/MOS micropower phase-lock loop (PLL) having a terminal assignment as shown in FIG. 5.

As shown, a power supply B+ is connected to terminal 160 and bypassed to system ground by capacitor 401. Terminals 50 and 80 are connected to earth ground.

Terminal 140, as shown, is connected to the output of the frequency doubler 5 and receives as its signal the engine speed signal at twice the frequency. It should be understood however that any source for a periodic signal indicative of engine speed or for a reference frequency or phase could be used according to the principles of this invention.

A resistance R401 is connected between terminals 9 and 13, and together with resistor R402 and capacitor C402 provides a low pass filter network which affects the response time of the timing signal generator 15 of FIG. 1. The generator 15 includes resistances R512, R601, R603, and R604, transistor Q601, comparator C3, amplifier A2, diode D501 and capacitor C502. The driving or speed signal at the output of the phase-locked loop (PLL) 400 is applied to capacitor C402.

The speed signal is also applied to the spark advance speed timing curve generator 7 of FIG. 1 as will be explained below.

The speed signal or drive signal from the PLL400 is applied to the oscillator 15 through resistance R512. The operation of the cyclical output generator is now explained with reference to FIG. 7 and the waveforms of FIG. 4.

The voltage applied from C402 provides a current through resistor R512 into the virtual ground at the input of operational amplifier A2.

Figure 4:
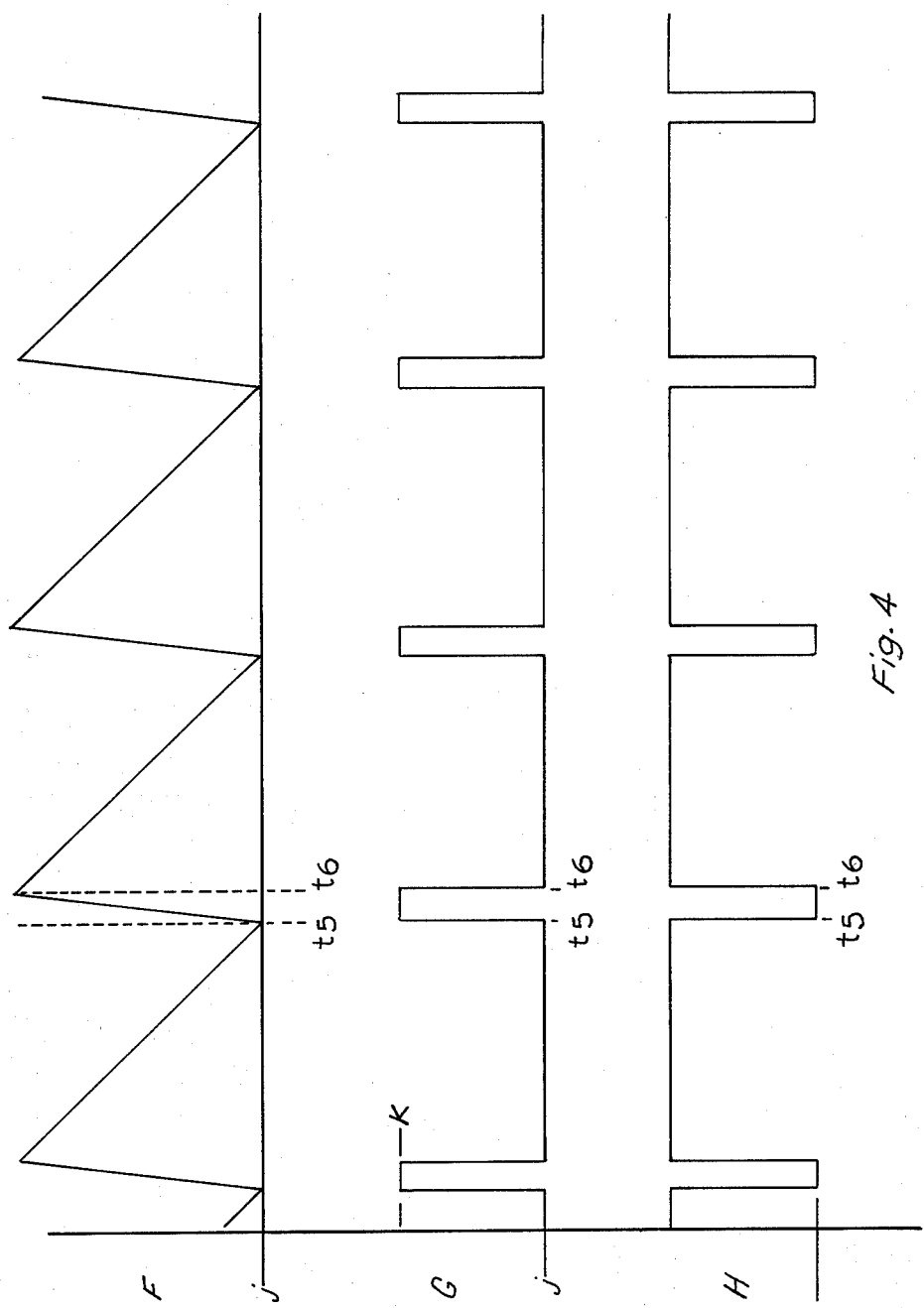
FIG. 4 shows the waveforms present at selected points in the circuit of FIG. 7.

The output of the operational amplifier A2, shown as F in FIG. 4, is a steadily decreasing periodic voltage in the form of a saw-tooth which causes a current equal to the current through R512 to flow out of capacitor C502. As shown in waveform F, the output of amplifier A2 continues to fall until its voltage reaches a threshold voltage j present at the negative or inverting input of the comparator C3 at time T5. As shown, the output of amplifier A2 is fed back to the positive or non-inverting terminal of capacitor C3.

The waveform G at the negative input of comparator C3 is shown at level j, level j being the threshold level for the comparator. The output waveform F of amplifier A2 is fed back to the positive or non-inverting terminal of comparator C3, and upon reaching the threshold voltage level j, the output of the comparator C3, shown as waveform H is driven low, biasing transistor Q601 towards cutoff and raising the voltage at the negative or inverting input of comparator C3 as shown by the waveform G going from j to k. Voltage k is dependent upon the B+ voltage as applied to the voltage divider network R603, R604. During this time, as shown between the time period t5 and t6, the negative-going pulse shown in waveform H also forward biases diode D501, allowing capacitor C502 to discharge, and inducing a negative going pulse at the negative or inverting terminal of amplifier A2. At this time, the amplitude of the saw-tooth rises very fast to retrace its waveform, restoring the saw-tooth to its peak voltage at time t6 to start a successive cycle.

At time t6, the output of comparator C3 is again driven positive, back-biasing diode D502 and driving transistor Q601 into conduction so that the voltage level at the negative terminal of the comparator C3 is once again driven to the threshold level j.

Capacitor C502 is recharged through R512 to start a new saw-tooth cycle, again driving the saw-tooth voltage from its peak voltage towards the threshold level j.

The period T1 of the saw-tooth waveform, shown in FIG. 2, will be dependent upon the voltage level at capacitor C402 of FIG. 7, storage means 13 of FIG. 1, as this level will determine the amount of time necessary for the voltage of the sawtooth waveform at the output of amplifier A2 to decrease from its peak voltage to its threshold level j, and for the cycle to repeat. As stated above, the signal level on the capacitor C402 is substantially indicative of the frequency at the output of the frequency doubler 5 and of engine speed. As the purpose of the phase-locked loop is to compare the phase of the saw-tooth shown in waveform F with the output of the frequency doubler, when the frequency and phase of the saw-tooth is coincident with that of the frequency doubler, the level of the signal in capacitor C402 is indicative of the speed of the engine.

The speed signal on capacitor C402 is also connected through the filter network formed by resistor R404 and capacitor C403 to the input of the spark advance curve generator 7 of FIG. 1.

The curve generator 7 of FIG. 1 is shown by amplifiers A1 and comparator C1 and comparator C2 of FIG. 7. The speed or drive signal from the phase-lock loop 400 is fed into a voltage controlled current source comprising operational amplifier A1 and resistors R501, R502, R503, R504, R505, R506, and R507, with the resistance of resistor R501 being equal to that of resistor R502 and the resistance of resistor R505 being equal to that of R507. The current source operates by developing a voltage across resistor R506 that varies directly with the input signal at resistor R501, and has a voltage gain dependent upon the resistance ratio of resistor R507 to resistor R501. This gain is made less than unity to allow resistor R506 to produce a minimal voltage drop, thereby allowing a large voltage range across resistor R508, which is the output resistor of the curve generator 7 shown in FIG. 1. The resistors R503 and R504 bias the current source for a negative output. Since the current can only be positive, there is no output current until the input voltage (the speed signal) has reached the offset level or bias level. This determines the engine speed at which the spark advance curve signal starts. This offset level can be varied to suit the needs of the individual engine.

Figure 6:
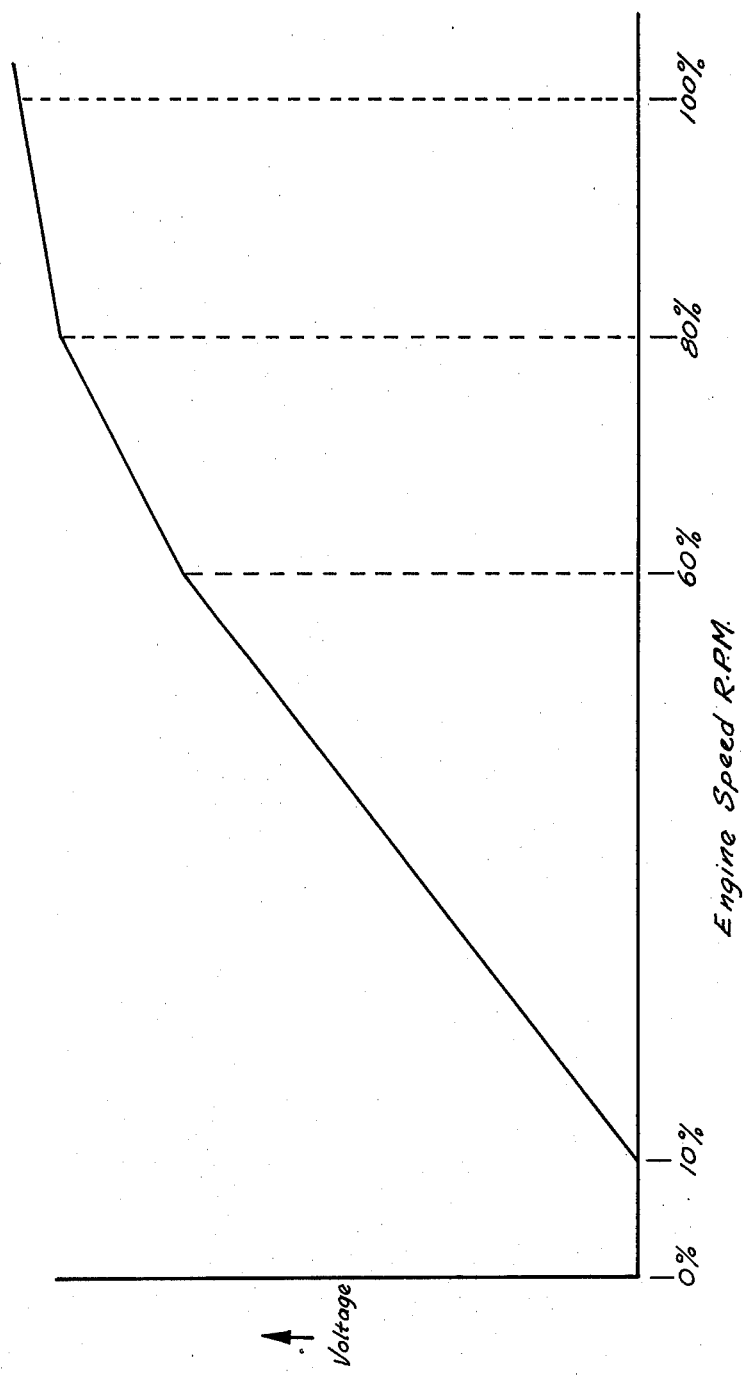
FIG. 6 is the speed advance curve produced by the generator shown in block 7 of FIG. 1 and in FIG. 7.

The current source formed by amplifier A1 and associated resistors provides a varying current through resistor R508 which determines the rate of timing advance with engine speed. In FIG. 6, the speed in R.P.M. is given from zero to 100%, 100% being full engine speed with the voltage level being indicative of the desired amount of spark advance for a given engine speed. As shown in FIG. 6, as an example, the offset is shown as 10% of full speed so that no spark advance is experienced until the engine speed reaches 10% of full speed. At that point, the speed signal from capacitor C402 applied to resistor C501 is equal to the bias provided by R503 and R504 and as the speed of the engine increases, driving the speed signal higher, the spark advance curve increases from a zero level to an intermediate point which for the sake of the example shown is at 60% of full speed.

The curve may be made nonlinear by the use of comparators C1 and C2 connected as constant voltage sinks. When the voltage across resistor R508 is greater than the selected reference level determined by the voltage divider resistors R608 and R609 for comparator C1 and resistors R611 and R612 for C2, each respective comparator will be switched into operation, altering the slope of the spark advance curve in response to the engine speed. The new slope is determined by the selection of resistor R607 for comparator C1 and R610 for C2. Capacitors C601 and C602 are provided to prevent the comparators from oscillating.

As shown, at 60% of engine speed, the voltage at resistor R508 exceeds the reference level determined by voltage divider resistors R608 and R609, switching comparator C1 into conduction, so that the output voltage rises at the rate determined by resistors R508 and R507.

At 80% of full speed, shown in the example, the slope of the speed advance curve changes again to a rate determined by the resistances R508, R507 and R610 when comparator C2 is switched into conduction.

An additional spark control may be added by using a vacuum sensor or any other suitable sensor responsive to a desired characteristic of the engine. As shown here, a vacuum sensor (not shown) actuates a vacuum switch S516 at a desired vacuum level, which either short circuits R516 or opens, putting R516 into the circuit with amplifier A4 and allowing the input of amplifier A4, previously at ground voltage level to go to a value determined by the voltage divider resistors R515, R516. Amplifier A4 then provides an output voltage, summed with the spark advance curve signal at the junction of resistors R518 and R613, to provide step increase to the spark advance curve signal at C4.

Similarly, and as well known in the art, the output of amplifier A4 can be made continuously variable to a continuous vacuum responsive signal level so that the speed curve signal is additionally responsive to the vacuum level at any engine speed or responsive to any other suitable parameter which can be measured to provide a variable voltage level to the input to amplifier A4 in a similar manner.

Figure 2A:
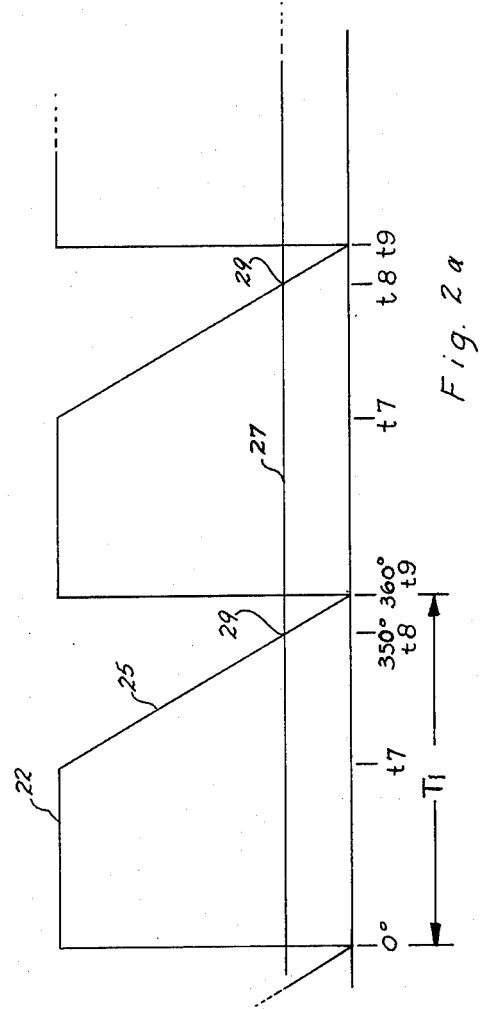

As shown in FIG. 2a and in FIG. 7, the system resolution is improved by using a clipper amplifier shown as A3 which steepens the working portion of the saw-toothed waveform 2 with the upper portion of the input saw-tooth driving the amplifier into clipping, giving it a constant high output level for the first part of the period, the output then following the input ramp down to the retrace point with a slope determined by the amplifier gain. The gain is preferably set by resistor divider resistors R513 and R514 so that the amplified ramp uses the same scale factor between voltage and engine angular position as does the spark advance curve generator, relating engine speed to spark advance. The relationship between the signal at the output of the amplifier A3 and a spark advance curve level is shown in FIG. 2a. As shown by waveform portion 22, only that portion of the waveform between times t7 and t8 is used by comparator C4 to compare the speed advance curve voltage with the timing signal voltage, to determine the firing position.

As stated above, only the nonclipped portion of the saw-tooth between times t7 and t8 is used as a timing signal at comparator C4. This signal is provided through resistor R605 to the negative or inverting terminal of comparator C4. The speed advance curve signal is provided to positive or non-inverting terminal of comparator C4. As shown in FIG. 2a, the spark advance curve level at a particular engine speed is shown by level 27, which is compared to the saw-tooth 25 by capacitor C4 and which provides an output signal when the saw-tooth has fallen below the level of the spark advance curve signal, to produce a high signal at the output of the comparator. This high signal is then used to trigger a high energy discharge at the proper firing angle with respect to engine rotational angle and particular speed. The means for providing a high energy discharge responsive to this signal may be any suitable means known in the art and does not form a part of this invention and is shown generally as 31.

As shown in FIG. 2a, the cyclical timing signal 25 is shown with the speed advance curve signal 27 superimposed at a level commensurate with engine speed for the desired spark advance angle desired. The truncated timing signal 25 is shown terminating at a 360° reference position t9 with the trigger signal occurring at time t8 (350°) at the concurrence 29 of the speed advance curve signal level 27 and the saw-tooth signal level 25, the angular advance being determined by the portion of the total period for the saw-tooth represented by the time between times t8 and t9.

As is well-known in the art, other means for comparing the speed advance curve signal with the timing signal saw-tooth level to produce the timing signal could be used, the comparator shown being one of many methods believe to be known to one skilled in the art.

As shown in this application, a cyclical signal generator produces a constant peak to peak amplitude timing signal having a period substantially equal to that of a reference input signal. The cyclical timing signal shown may be a saw-tooth for use in a spark advance system where the input reference signal is the engine speed. The frequency and phase of the timing signal are tied to the reference signal through a phase-locked loop whose output is a speed signal or driving signal. The level of the speed signal or driving signal is used to control the frequency and phase of the timing signal generator so its output signal is phase coincident with the reference signal.

Additionally shown is a spark advance curve generator which has as an input the same speed signal which is used to control the timing signal generator oscillator in response to that speed signal. It produces a speed advance curve whose level is commensurate with the desired advance for a particular engine, and is responsive to engine speed.

The speed advance curve signal is then compared with a timing signal to provide the spark trigger signal at the appropriate moment within the period of an engine cycle. The cyclical generator shown is a means producing a periodic signal having a constant peak to peak amplitude and with its amplitude varying within at least a part of a cyclical period. The invention does not necessarily require a saw-tooth waveform, as any suitable waveform having an amplitude indicative of the instantaneous cyclical angle may be used.

Additionally shown in this disclosure is a means for locking the frequency and phase of the cyclical generator output to an input reference frequency. The particular apparatus shown as a phase-locked loop operates by comparing the phase of the reference input frequency with a cyclical output frequency, and provides a charging voltage to capacitor C402, or discharges capacitor C402, depending upon the difference in phase between the two signals. Where the two signals are equal in phase, and where the level of signal on C402 is appropriate for that frequency, no change is made by the phase-locked loop to the signal level on the capacitor C402.

As described above, the cyclical output signal may be used as a timing signal, for example in the use of the ignition spark advance control system. In this case, and as shown in the disclosure, the cyclical output frequency is a saw-tooth, whose amplitude at any point in time is indicative of the engine angular rotation. A frequency doubler doubles the engine rotational speed signal, and this doubled frequency signal is then applied to the input of the phase-locked loop and compared to the cyclical output timing signal frequency. This is typical where the type of energy discharged device requires a trigger signal at a higher frequency, as, for example, where doubled ended coils are used. However, as would be apparent to one skilled in the art, the frequency of the reference input can be any suitable frequency commensurate with the application of the device.

The system may be used to provide a trigger signal at a desired point within an operation of any cyclical device, not necessarily an engine. Additionally, it can be used to generate any trigger signal required in the cyclical operation of an engine in addition to the example shown of the spark advance trigger signal.

Additionally as shown in this disclosure, the spark advance curve signal compared with the timing signal to generate the ignition trigger signal may also be combined with other signals indicative of other parameters within the engine, such as vacuum, in either a stepwise manner or a continuous manner. As would be apparent to one reading this disclosure, a signal indicative of an engine speed or load, such as intake manifold vacuum may be used to generate either a spark signal or any needed signal at the appropriate instant in a cycle of operation. The application of the invention shown herein is not limited to the particular examples, but is applicable to the initiation of a signal at a desired instant of time within the period of a cyclical device.

I claim:

1. A system for timing the occurrence of an event at a predetermined phase angle in the period of a cyclically operating device comprising means for producing a first timing signal having a substantially constant peak to peak amplitude, said first timing signal having an amplitude varying over a portion of a period of oscillation and with an instantaneous amplitude of said portion of said first timing signal being indicative of the phase of the first timing signal;
   means for comparing and aligning the phase of said first timing signal with the phase of said cyclically operating device;
   means including a clipper amplifier for amplifying and clipping said first timing signal thereby producing an amplified and clipped second timing signal;
   means responsive to said amplified and clipped second timing signal and to a parameter of said cyclically operating device for producing an output signal at said predetermined phase angle of said cyclically operating device.

2. The system of claim 1, wherein said means for producing said first timing signal includes a saw-tooth generator and said clipper amplifier is operatively connected to said saw-tooth generator.

3. The system of claim 1, wherein said means for comparing and aligning includes means for producing a drive signal for controlling the phase of said first timing signal.

4. The system of claim 3, wherein said means for comparing and aligning includes means for storing said drive signal.

5. The system of claim 3, wherein said means for producing said first timing signal is a saw-tooth generator, for producing a saw-tooth signal, responsive to said drive signal, said saw-tooth generator varying the slope of said saw-tooth signal responsive to a level of said drive signal, said drive signal level being indicative of an operating characteristic of said device.

6. The system of claim 5, wherein said drive signal is indicative of the speed of said device.

7. The system of claim 1, wherein said means for producing said first timing signal includes a switchable means, said switchable means being connected to an output of said means for producing said first timing signal in a feedback arrangement, said switchable means switching from a first state to a second state in response to said first timing signal reaching a first peak amplitude, said switchable means resetting said first timing signal to a second peak amplitude in response to said switchable means being in said second state.

8. The system of claim 7 wherein said switchable means includes a switch means and a means to control said switch means, said means for producing said first timing signal including an oscillator, said switch means having a first terminal connected to an output terminal of said oscillator and a second terminal connected to said means to control said switch means, said means to control the switch means having an input terminal connected to said oscillator output terminal and producing a control signal responsive to said means for producing said first timing signal reaching said first peak amplitude, said switch means changing state in response to said control signal, and said means for producing said first timing signal being reset in response to said switch means changing state.

9. The system of claim 8 wherein said oscillator is an integrator for producing a sawtooth wave signal, said means to control said switch means being a comparator having a first terminal connected to a reference level signal and including means to change the reference level signal at a second terminal of said comparator, said means to change said reference level signal having a control terminal connected to said comparator output terminal for increasing said reference level signal in response to said control signal at an output of said comparator, said switch means being a diode and being backbiased in response to the absence of a comparator output signal and forward biased in response to said comparator output signal, said integrator including a storage means and with the energy stored in said storage means being modified through said diode when said diode is forward biased to reset said means for producing said first timing signal.

10. The system of claim 5 wherein said saw-tooth signal generator is an integrator having a storage means, and said storage means is connected to said drive signal, said slope of said saw-tooth signal being changed in response to said level of said drive signal.

11. The system of claim 10 wherein said drive signal is a DC signal having an amplitude level indicative of the frequency of said first timing signal.

12. The system of claim 3 wherein said drive signal has a level indicative of the frequency of said first timing signal.

13. The system of claim 5 wherein said means for producing said first timing signal includes means for resetting said saw-tooth generator in response to the amplitude of said saw-tooth signal reaching a first level of said peak to peak amplitude, said resetting means including a switch means, and means to change the state of said switch means from a first to a second state in response to said amplitude being at said first level, said means to change the state of said switch means having an input connected to an output of said saw-tooth generator and an output connected to said switch means, said saw-tooth generator means being an integrator, and said switch means being connected to an input terminal of said integrator, said integrator including a storage device discharging charging through said switch means when said switch means is in said second state, said resetting means altering a signal at said input terminal of said integrator for resetting an output of said integrator to a second level of said peak to peak amplitude.

14. The system of claim 13 wherein said means to change the state of said switch means includes a threshold device having first and second input terminals, with said first input terminal being connected to said output of said saw-tooth signal generator and said second terminal being connected to a reference signal, said threshold device having first and second output levels, and being driven from said first output level to said second output level in response to said output of said saw-tooth signal generator reaching said first level of said peak to peak amplitude, said switch means being a diode and said diode being forward biased for charging said integrator storage device in response to said threshold device output level being at said second output level.

15. An ignition spark advance system for use with an internal combustion engine, having a means for sensing the rotational speed of said engine and producing an engine rotational signal, means for producing a spark advance signal, means for generating a timing signal having a constant peak to peak amplitude and a varying amplitude over its period of oscillation, said amplitude being indicative of said timing signal phase angle, and means to compare the phase of said engine rotational signal and said timing signal to produce a drive signal, said means for generating a timing signal having an input connected to receive said drive signal for driving the frequency of said timing signal toward an engine rotational signal frequency, means for amplifying and clipping said timing signal operatively connected to means for comparing said spark advance signal with said timing signal for producing a trigger signal and means responsive to said trigger signal for producing a high energy discharge spark.

16. The system of claim 15, wherein said means for producing said spark advance signal has a first input connected to said drive signal,
said means for producing said spark advance signal producing a spark advance signal proportional to said drive signal.

17. The system of claim 16, wherein said means for producing said spark advance signal includes clamping means, said clamping means clamping said spark advance signal to a predetermined level, responsive to said drive signal being below said clamping level and said spark advance signal increasing proportionally to the change in said drive signal, above said clamping level.

18. The system of claim 17 wherein said means for generating said spark advance means signal includes a second clamping means with a second clamping level applied to said second clamping means, and means for altering the proportionality slope of said spark advance signal to said drive signal, said second clamping means connecting said altering means to said spark advance means for altering the slope of said spark advance signal.

19. A spark advance system for an internal combustion engine including means for generating an engine speed signal with a frequency proportional to engine speed, means for generating a trigger signal to produce a high energy spark discharge, and further comprising means for generating a cyclical timing signal having a constant peak to peak amplitude, and an amplitude indicative of the phase angle of said timing signal, means for generating a drive signal having an input connected to said engine speed signal and an input connected to said timing signal, said means for generating said timing signal being connected to said drive signal and responsive thereto for controlling the frequency of said timing signal, said means for generating said drive signal altering the level of said drive signal for maintaining said frequency of said timing signal substantially at said frequency proportional to engine speed, said timing signal having a varying level, said level being indicative of engine rotational angle, said means for generating said timing signal being operatively connected to means for amplifying and clipping said timing signal to provide an amplified and clipped timing signal, and said means for generating said trigger signal generating said trigger signal, in response to said amplified and clipped timing signal reaching a predetermined level, corresponding to a predetermined engine angle.

20. The spark advance system of claim 19, wherein said means for generating said trigger signal includes means for generating a spark advance signal responsive to said drive signal, said spark advance signal having a level proportional to said engine speed and related to said level of said timing signal for generating said trigger signal at a predetermined rotational angle of said engine for a predetermined engine speed.

21. The spark advance system of claim 20 wherein said means for generating said trigger signal is connected to said amplified and clipped timing signal and to said spark advance signal and includes means responsive to the concurrence of a predetermined level of said spark advance signal with a predetermined level of said amplified and clipped timing signal for triggering said high energy spark discharge.

22. The spark advance system of claim 21 wherein said means for generating said trigger signal is a threshold device, said timing signal is a saw-tooth, said means for generating said trigger signal has a first output responsive to said level of said timing signal being below a threshold level of said threshold device and having a second output in response to said level of said timing signal reaching said threshold level, and said threshold level being said level of said spark advance signal.

23. The spark advance system of claim 22 wherein said means for generating said spark advance signal includes a function generator for producing a nonlinear signal characteristic in response to said engine frequency and said function generator input being connected to said means for generating said drive signal.

24. The spark advance system of claim 23 wherein said means for generating said spark advance signal includes a function generator for generating a nonlinear signal characteristic in response to said engine speed.

25. The spark advance system of claim 24 wherein said function generator includes first and second amplifier means, each having outputs responsive to said engine speed signal, and with the outputs of said amplifers being combined to produce a nonlinear spark advance signal, said engine speed signal being connected to an input of said first amplifier means, an input of said second amplifier means being connected to said output of said first amplifier means, said second amplifier means generating an output signal in response to said output of said first amplifier reaching a predetermined level corresponding to a predetermined engine speed.

26. The spark advance system of claim 25 wherein said first amplifier means includes clamping means, said clamping means clamping said output of said first amplifier means to a first predetermined level corresponding to an engine speed range, said output of said first amplifier means being unclamped in response to said engine speed signal reaching said first predetermined level, to produce said nonlinear spark advance signal proportional to engine speed.

27. The spark advance system of claim 26, wherein said second amplifier means includes clamping means for clamping said output of said second amplifier means to a second predetermined level, said output of said second amplifier being unclamped in response to said output of said first amplifier reaching said second predetermined level, to produce said nonlinear spark advance signal proportional to engine speed.

* * * * *